3,214,390
POLYMERIC EPOXIDES
Edwin J. Vandenberg, Wilmington, Del., assignor to Hercules Powder Company, Wilmington, Del., a corporation of Delaware
No Drawing. Filed Jan. 25, 1960, Ser. No. 4,210
2 Claims. (Cl. 260—2)

This invention relates to new polymeric epoxides and more particularly to polymers of alkyl glycidyl ethers.

In accordance with this invention it has been found that alkyl glycidyl ethers may be polymerized with the polymerization taking place through the epoxy group to yield high molecular weight polymeric epoxides many of which are amorphous and rubberlike in character and others of which are crystalline. These new poly(alkyl glycidyl ethers) are solid polymers having a reduced specific viscosity of at least about 0.2, and preferably at least about 0.5 as measured on an 0.1% solution in cyclohexanone at 50° C.

Any alkyl glycidyl ether may be polymerized to produce the new polymeric epoxides of this invention. These epoxy ethers, which are also known as alkyl glycolocides or alkyl 2,3-epoxypropyl ethers, have the general formula

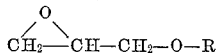

where R is any alkyl, cycloalkyl, or haloalkyl radical, as for example, methyl, ethyl, propyl, isopropyl, butyl, isobutyl, tertbutyl, neopentyl, amyl, isoamyl, hexyl, isohexyl, octyl, 2-ethylhexyl, nonyl, decyl, lauryl, stearyl, etc., cyclohexyl, cyclohexylmethyl, α-terpinyl, dihydroterpinyl, hydroabietyl, etc., and haloalkyl radicals such as 2-chloroethyl, 2-bromoethyl, 2-chloropropyl, 3-chloropropyl, 2, 2,2-trifluoroethyl, 2,2,2-tris(chloromethyl)ethyl, etc.

The new poly(alkyl glycidyl ethers) of this invention are in general rubberlike in character and may be used as polymeric plasticizers, wax additives, lubricating oil additives, in adhesives, and in some cases may be vulcanized to produce vulcanized elastomers. The crystalline polymers are useful in plastic applications, especially as films and in fibers and molded plastics.

The following examples will illustrate the preparation of the new poly(alkyl glycidyl ethers) of this invention. All parts and percentages are by weight unless otherwise indicated. The molecular weight of the polymers produced in these examples is shown by the reduced specific viscosity (RSV) given for each. By the term "reduced specific viscosity" is meant the $\eta_{sp/c}$ determined on an 0.1% solution of the polymer in cyclohexanone containing 0.1 g. of the polymer per 100 ml. of solution at 50° C. unless otherwise indicated.

*Example 1*

A polymerization vessel in which the air had been replaced with nitrogen was charged with diethyl ether and 10 parts of hexyl glycidyl ether. After equilibrating at 30° C., a solution of the catalyst was injected. The catalyst solution was prepared by diluting a 1 molar solution of triethylaluminum in n-heptane to 0.5 molar with ether, adding an amount of water equal to 0.6 mole per mole of triethylaluminum and then agitating the solution for 16 hours. The amount of catalyst solution used in the polymerization of this invention contained 4 millimoles of the triethylaluminum-water reaction product based on the triethylaluminum. The total amount of diluent present in the polymerization reaction mixture was 17.6 parts, of which diethyl ether amounted to 88%, the remainder being the n-heptane that was present in the catalyst solution. After 19 hours at 30° C., 4 parts of anhydrous ethanol was added and the ether-soluble polymer was isolated by concentrating the solution and then precipitating the polymer by adding about 10 volumes of methanol containing 0.2% Santonox, i.e., 4,4′-thiobis(6-tert-butyl-m-cresol). The polymer so obtained was washed with methanol and dried. It was a tacky rubber having an RSV of 0.69 measured as an 0.1% solution in chloroform at 25° C.

*Example 2*

Example 1 was repeated except that the polymerization was run for 43 hours, an additional 4 millimoles of the catalyst being added at the end of 20 hours. At the end of the polymerization the catalyst was removed by washing the reaction mixture with 3% aqueous hydrogen chloride, washing with water until neutral, then with 2% aqueous sodium bicarbonate and again with water until neutral. The ether-soluble, methanol-insoluble polymer was isolated as before. It was a very tacky rubber having an RSV of 0.65 as measured in cyclohexanone at 50° C.

*Example 3*

Example 1 was repeated except that the catalyst used in this case was 4 millimoles of triethylaluminum which had been reacted at 0.5 M concentration in 70:30 diethyl ether:n-heptane with 0.5 mole of acetylacetone per mole of triethylaluminum and then with 0.5 mole of water per mole of triethylaluminum prior to use in the polymerization process. The total diluent in this case was 68% ether, the remainder being n-heptane. After 19 hours at 30° C., the catalyst was removed as in Example 2 and the ether-soluble, methanol-insoluble polymer was isolated. The poly(hexyl glycidyl ether) so obtained amounted to a conversion of 51%. It was a very tacky, snappy rubber and had an RSV of >1.8 as measured in cyclohexanone at 50° C.

*Example 4*

Example 1 was repeated except that 10 parts of 2-chloroethyl glycidyl ether was substituted for the 10 parts hexyl glycidyl ether used in that example. In this polymerization both an ether-soluble and an ether-insoluble polymer were formed. At the end of the polymerization reaction the solid, ether-insoluble polymer was separated by centrifugation and then was washed with ether and finally with ether containing 0.2% Santonox and dried. This ether-insoluble polymer had an RSV of 0.52 when measured as an 0.1% solution in cyclohexanone at 50° C. It was a tacky, rubbery film-forming material.

*Example 5*

The procedure described in Example 2 was repeated except that 10 parts of isopropyl glycidyl ether was substituted for the 10 parts of hexyl glycidyl ether used in that example, the catalyst used was 8 millimoles, added in two portions as before, of triisobutylaluminum which was not prereacted with water, and the total diluent was n-heptane. After removing the catalyst as described in Example 2, 0.5% of Santonox was added, and the ether-soluble polymer was isolated by evaporating the diluent and drying. It amounted to a conversion of 37% and was a very tacky rubber, which had an RSV of 0.48 as measured in cyclohexanone at 50° C.

*Example 6*

The procedure described in Example 3 was repeated except that 10 parts of isopropyl glycidyl ether was substituted for the hexyl glycidyl ether used in that example, and the polymerization was run for 43 hours at 30° C., a second and equal amount of the catalyst being added after 20 hours of polymerization. The total diluent was 20% ether, the remainder being n-heptane. The ether-soluble polymer so obtained was isolated as described in Example 5 and amounted to a conversion of 80%. This poly(isopropyl glycidyl ether) had an RSV of 4.8 and was a very tacky rubber.

*Example 7*

Example 6 was repeated except that the total diluent was 82% diethyl ether. The poly(isopropyl glycidyl ether) so obtained amounted to a conversion of 82%. It was a tacky, snappy rubber having an RSV of 6.0.

*Example 8*

Methyl glycidyl ether was polymerized by the procedure described in Example 7 for the polymerization of isopropyl glycidyl ether. At the end of the polymerization reaction, 4 parts of ethanol was added and the polymer was precipitated by adding 5 volumes of n-heptane. The heptane-insoluble polymer was separated, washed twice with n-heptane and finally with n-heptane containing 0.1% Santonox and dried. The poly(methyl glycidyl ether) so obtained was insoluble in heptane and swollen, but largely insoluble in water. It was a snappy rubber and had an RSV of 2.8.

*Example 9*

Isobutyl glycidyl ether was polymerized by the procedure described in Example 1, except that 10 parts of the isobutyl glycidyl ether was substituted for the hexyl glycidyl ether used in that example, and the polymerization was carried out for 43 hours at 30° C. a second and equal portion of the catalyst being added after 20 hours. In this polymerization both an ether-soluble and an ether-insoluble polymer were formed. The catalyst was removed as described in Example 2 and the ether-insoluble polymer was separated by centrifugation, washed with ether and then with ether containing 0.2% Santonox and dried. This ether-insoluble poly(isobutyl glycidyl ether) was a somewhat tacky rubbery solid and had an RSV of >0.5 as measured in cyclohexanone at 50° C.

The ether-soluble polymer was isolated from the reaction mixture filtrate and the ether washings by concentrating the solution and then precipitating the polymer by adding a large volume of methanol containing 0.2% Santonox. This ether-soluble, methanol-insoluble polymer so obtained was then washed with methanol and dried. It was a very tacky rubber and had an RSV of 0.3 as measured in cyclohexanone at 50° C.

*Example 10*

The procedure of Example 9 was repeated except that in this case the polymerization was run for only 19 hours, only one portion of catalyst was added, and the diluent contained only 12% ether. In this polymerization there was isolated only an ether-soluble, methanol-insoluble polymer. It was a very tacky rubber and had an RSV of 0.76 measured in cyclohexanone at 50° C.

*Example 11*

The procedure of Example 3 was repeated except that 10 parts of isobutyl glycidyl ether was substituted for the hexyl glycidyl ether used in that example. The catalyst was removed and the ether-soluble and ether-insoluble polymers were isolated as described in Example 9. The ether-insoluble poly(isobutyl glycidyl ether) was obtained and amounted to a conversion of 45%. It was a tacky, snappy rubber with an RSV of 2.5 as measured in cyclohexanone at 50° C. The ether-soluble, methanol-insoluble poly(isobutyl glycidyl ether) amounted to a conversion of 14% and was a tacky, snappy rubber which had an RSV of 2.9 as measured in cyclohexanone at 50° C.

This application is a continuation-in-part of my application U.S. Serial No. 738,625 filed May 29, 1958, and now abandoned.

What I claim and desire to protect by Letters Patent is:

1. As a new composition of matter a solid, rubbery, homopolymer of a glycidyl ether having the formula

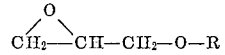

where R is a haloalkyl group containing from 2 to 5 carbon atoms, said homopolymer having a reduced specific viscosity of at least about 0.5 as measured on a 0.1% solution in cyclohexanone at 50° C.

2. The composition of claim 1 wherein the homopolymer is poly(2-chloroethyl glycidyl ether).

References Cited by the Examiner

UNITED STATES PATENTS

| | | | |
|---|---|---|---|
| 2,743,285 | 4/56 | Wilkes et al. | 260—2 |
| 2,971,988 | 2/61 | Hill et al. | 260—2 |
| 3,024,219 | 3/62 | France et al. | 260—2 |
| 3,135,705 | 6/64 | Vandenberg | 260—2 |
| 3,135,706 | 6/64 | Vandenberg | 260—2 |

FOREIGN PATENTS

| | | |
|---|---|---|
| 477,843 | 1/38 | Great Britain. |

OTHER REFERENCES

Epichlorohydrin, Shell Technical Booklet SC: 49–35, Shell Chemical Corporation, 1949, page 34 specially relied on.

WILLIAM H. SHORT, *Primary Examiner.*

PHILIP E. MANGAN, HAROLD N. BURSTEIN, JOSEPH R. LIEBERMAN, *Examiners.*